United States Patent [19]

Cogliano

[11] Patent Number: 4,994,328

[45] Date of Patent: Feb. 19, 1991

[54] WATERPROOFING MEMBRANE

[75] Inventor: Joseph A. Cogliano, Pasadena, Md.

[73] Assignee: W. R. Grace & Co. - Conn., New York, N.Y.

[21] Appl. No.: 391,755

[22] Filed: Aug. 10, 1989

[51] Int. Cl.$^5$ .......................... B32B 11/04; E04C 3/20
[52] U.S. Cl. ........................................ 428/489; 156/71
[58] Field of Search .................. 428/489, 40; 427/444; 156/71

[56] References Cited

U.S. PATENT DOCUMENTS

| | | | |
|---|---|---|---|
| 3,819,394 | 6/1974 | Schnebel, Jr. et al. | 427/444 |
| 4,374,687 | 2/1983 | Yamamoto | 428/40 X |
| 4,588,458 | 5/1986 | Previsani | 156/71 |
| 4,636,414 | 1/1987 | Tajima et al. | 428/40 |
| 4,670,071 | 6/1987 | Cooper et al. | 156/71 |
| 4,755,409 | 7/1988 | Harkness | 428/489 X |
| 4,775,567 | 10/1988 | Harkness | 428/489 X |

Primary Examiner—Thomas J. Herbert
Attorney, Agent, or Firm—Howard J. Troffkin

[57] ABSTRACT

Adhesive, waterproof membranes capable of adhering to freshly poured concrete compositions upon curing. The waterproof membranes of this invention comprise a bituminous sheet having at least one major surface coated with a non-tacky polymeric coating composition which contains a water-insoluble polymer, and optionally a filler capable of absorbing or reflecting infrared or ultra violet radiation and/or a plasticizer. Suitable water-insoluble polymers for use in this invention include alpha-beta-ethylenically unsaturated carboxylic acid polymers or polyvinyl alcohol polymers.

10 Claims, No Drawings

WATERPROOFING MEMBRANE

BACKGROUND OF THE INVENTION

1. Field of the Invention

This invention relates to protective waterproofing membranes. More specifically the present invention is directed to a bituminous waterproofing sheet material having at least one major surface coated with a non-tacky polymeric coating composition. The polymeric coating composition is capable of adhering to freshly poured concrete surfaces and to the cured concrete substructure, and also provides a protective coating during storage and application of the sheet material.

2. Description of the Prior Art

It is known that concrete surfaces and the like can be sealed in a waterproof manner by forming or applying thereon a membrane of a bituminous composition such as asphalt, tar, pitch, or other material which is substantially impermeable to moisture and water vapor. Preformed rubberized asphalt sheet-like materials useful for this purpose are well known. Examples of these materials are disclosed in U.S. Pat. Nos. 3,741,856; 3,853,682, 3,900,102 and 4,215,160. These waterproofing materials have a laminate structure comprising a support sheet having at least one major surface coated with a membrane of a bituminous composition. The bituminous composition has adhesive properties which render it adherent to the support sheet and to the substructure, such as a concrete slab, to which it is applied.

The laminated structures currently available are supplied in the form of rolls. In this form, the laminated structure further comprises a flexible release sheet, such as in the form of a siliconized paper, positioned adjacent to the surface of the bituminous membrane which after removal of the release sheet will eventually be placed in contact with a concrete substructure. This release sheet is needed prior to application to prevent the adhesive membrane from adhering to the sheet immediately adjacent thereto and to protect the adhesive membrane layer from various forms of degradation. This release sheet must be removed to expose the adhesive membrane when applying the waterproofing sheet material to the substructure.

This type of waterproofing sheet material is normally applied after the concrete substructure has been formed. Usually these substructures, such as building foundations, are situated with sufficient space around their perimeter to allow the application of these waterproofing sheets. However, in urban locations, as well as elsewhere, structures are built closely between existing foundations. In fact, to maximize the utility of the land, new buildings are often built directly adjoining the existing ones. Thus, there is no room to apply an external waterproofing sheet. In such situations it is advantageous to pre-apply the waterproofing material in a manner to have it become an integral part of the part of the ultimately formed concrete substructure formation. Typically, this is done by applying the waterproofing material to an outer concrete form, known as lagging.

However, the conventional laminated structure of the bituminous waterproofing sheet material and release sheet presents problems of removal and disposal of the release sheets. This is particularly true when re-bars and inner concrete forms are placed in front of the lagging prior to casting the concrete.

SUMMARY OF THE INVENTION

An object of this invention is to provide a waterproofing sheet material capable of adhering to freshly poured concrete compositions and the cured substructures formed therefrom.

Another object of this invention is to provide a laminate sheet material comprising an adhesive sheet-like bituminous waterproofing membrane with a non-tacky surface that is capable of adhering to freshly poured concrete compositions and the cured substructures formed therefrom.

In accordance with this invention, there have been provided certain novel adhesive waterproofing sheet materials which comprise adhesive bituminous membranes having at least one major surface coated with a tack-free composition, which, when contacted with the freshly poured concrete, are capable of providing adhesive capability between the membrane and the freshly poured concrete surface. The waterproofing sheet materials of this invention are prepared by coating at least one major surface of a bituminous membrane with a water-insoluble polymeric composition comprised of a polymer selected from a polyvinyl alcohol or an alpha-beta ethylenically unsaturated carboxylic acid or esters thereof.

DETAILED DESCRIPTION

The present invention is directed to adhesive, waterproof membranes capable of adhering to freshly poured concrete compositions and to the cured concrete substructure formed therefrom.

The waterproof membranes of this invention comprise a bituminous sheet having at least one major surface coated with a non-tacky polymeric coating composition. The coating composition further comprises certain water-insoluble polymers, which may optionally have therein a filler capable of absorbing or reflecting infrared or ultra violet radiation and/or a plasticizer. For purposes of this invention, the term "water-soluble" polymer refers to those polymers which, after application to the membrane are insoluble in water under ambient temperature conditions. Suitable water-insoluble polymers for use in this invention include alpha-beta-ethylenically unsaturated carboxylic acid polymers and copolymers or polyvinyl alcohol polymers as more fully described herein below.

The preferred alpha-beta ethylenically unsaturated carboxylic acid polymers for use in this invention include, but are not limited to, the various homopolymers and co-polymers of acrylic acid, $C_1-C_3$ alkyl substituted acrylic acid, and esters thereof such as; acrylic acid, methacrylic acid, ethacrylic acid, methyl acrylate, ethyl acrylate, n-propyl acrylate, methyl methacrylate, methyl ethacrylate, isopropylacrylate, n-butyl acrylate, isobutyl acrylate, tert-butyl acrylate; copolymers of olefin-acrylic acid or esters such as, ethylene acrylic acid; as well as homo and copolymers of dicarboxylic acids, their esters and anhydrides, such as styrene-maleic anhydride, itaconic acid, maleic acid, fumaric acid, and the like, and mixtures thereof.

The preferred polyvinyl alcohols for use in this invention are those that: (a) are at least 97% hydrolyzed and are preferably completely hydrolyzed, (b) have a high molecular weight, preferably having a number molecular weight of about 105,000 to about 110,000, and a weight average molecular weight of about 195,000 to about 205,000, and (c) a degree of polymerization of about 2400 to about 2500.

A plasticizer may optionally be added to the polymeric coating to enhance the flexibility of the coating and is added in a weight proportion of polymer:plasticizer in the range 1:0–0.7. Suitable plasticizers for addition to the polyvinyl alcohol include, but are not limited to, glycerin, sodium thiocyanate, polyethyoxylated sorbitol, triethanol amine neutralized with acetic acid, diethylene triamine, and the like, and mixtures thereof. Suitable plasticizers for addition to the alpha-beta ethylenically unsaturated carboxylic acid polymers include, but are not limited to, triaryl phosphate, N-n-butylbenzenesulfonamide, primary alcohol ethoxylate, sulfonate type polymers such as salts of naphthalene sulfonate-formaldehyde condensate, and the like, and mixtures thereof. Various other plasticizers are well known to those skilled in the art, and the choice of a particular plasticizer is not critical per se to the invention, provided, however, that the particular plasticizer enhances the flexibility of the final dried polymeric coating to aid in the application of the bituminous sheets to the lagging without having excessive cracking in the coating.

A filler material capable of absorbing or reflecting ultraviolet and infrared radiation may also be added to the polymeric coating to protect the waterproof bituminous sheets from the effects of outdoor exposure. Suitable fillers for use in this invention, effective as ultra violet absorbing or reflecting, infrared reflecting agents include, but are not limited to, silica sand, titanium dioxide, carbon black, aluminum powder, calcium carbonate, talc, delaminated hydrous kaolin, surface modified calcined kaolin and the like, and mixtures thereof. The preferred mesh size for these fillers is in the range 70 to 325 mesh and is preferably 150 to 225 mesh. The most preferred filler is a 200 mesh silica sand. The final polymeric coating contains a weight proportion of polymer:filler in the range 1:8–11, and preferably 1:9–10.

In a preferred embodiment, the non-tacky coating composition of this invention is prepared by adding powdered polyvinyl alcohol (PVA) to water with rapid stirring while slowly heating until almost boiling. The PVA solution is then cooled, and a 200 mesh silica sand filler and glycerin plasticizer are then added with stirring to form a coating composition. The final coating composition is a suspension containing a weight proportion of PVA:filler:plasticizer 1:10:0.5.

The coating suspension can then be coated onto one or both sides of the adhesive waterproofing bituminous sheets to give a dry loading in the range 7 g/ft$^2$ to 10 g/ft$^2$. The coating suspension can be applied to the bituminous sheet by any of the various techniques known to those skilled in the art including, but not limited to, roller application, spray application, immersion, co-extrusion and the like. After drying, the coated surface of the bituminous sheet is non-tacky, insoluble in water under ambient temperature conditions, impervious to degradation by ultraviolet radiation, reflective so as to reduce solar heating, and yet permits the formation of a strong adhesive bond between the membrane and the cured concrete substructure when contacted with freshly poured concrete.

It is believed that one skilled in the art, using the preceding detailed description, can utilize the present invention to its fullest extent. The principles, preferred embodiments and modes of operation of the present invention have been described in the foregoing specification. The following examples are provided to illustrate the invention in accordance with the principles of this invention, but is not to be construed as limiting the invention in any way except as indicated in the appended claims. Variations and changes may be made by those skilled in the art without departing from the spirit of the invention. All parts and percentages are by weight unless otherwise indicated.

EXAMPLE 1

A non-tacky coating composition was prepared by adding polyvinyl alcohol (PVA) (commercially available from du Pont as Elvanol H.V.) to water with rapid stirring at room temperature and then heated to almost boiling. Upon cooling, a finely powdered silica sand having a particle size distribution of:

| Mesh | Weight % |
| --- | --- |
| +70 | 0 |
| 70–200 | 24.2 |
| 200–325 | 47.4 |
| −325 | 28.4 | was added to the PVA solution together with glycerin at a weight proportion of 1:10:0.5 of PVA:silica:glycerin. The mixture was coated onto the adhesive side of a bituminous sheet in an amount to give a dry loading of 8.6 g/Ft$^2$. The coated membrane was exposed outdoors for varying times up to eight weeks, and then had concrete poured against them. After the concrete cured for one week, the adhesive strength was determined in a 90° peel test at 2 inches/minute. The results are as follows:

| Exposure (weeks) | Peel Strength (pounds/inch) |
| --- | --- |
| 0 | 12.5 |
| 2 | 11.8 |
| 4 | 12.5 |
| 8 | 12.5 |

All samples exhibited strong adhesive bonding at the concrete-membrane interface, and samples separated in the asphalt layer rather than at the interface.

EXAMPLE 2

This example illustrates the use of alpha-beta ethylenically unsaturated carboxylic acid polymer coatings on the bituminous membranes. The bituminous membranes were coated on a dry loading basis with a commercial solution of 20% polyacrylic acid solution and 20% TiO$_2$. The membranes were exposed to the outdoor elements for various times and evaluated for peel strengths. The results are outlined in Table 1.

TABLE 1

Peel Strengths of Coated Samples/Effect of Contact Time

90° Peel Strength, lbs/in (% Cohesive Failure)

| Sample No. | Coating, g/ft² | (a) mils | 1 Day V | 1 Day H | 2 Days V | 2 Days H | 7 Days V | 7 Days H | 14 Days V | 14 Days H | 28 Day V | 28 Day H |
|---|---|---|---|---|---|---|---|---|---|---|---|---|
| 1 | 0    | 0   | 10.8(100) | 11.7(90)  | 10.2(100) | 11.3(100) | 11.7(60) | 11.0(90) | 11.8(70) | 10.0(90) | 10.3(40) | 8.7(100) |
| 2 | 0.41 | .09 | 10.3(100) | 13.2(90)  | 11.0(60)  | 12.7(90)  | 11.7(L)  | 11.0(L)  | 11.7(60) | 10.7(60) | 12.5(10) | 11.0(90) |
| 3 | 0.52 | .12 | 11.7(100) | 10.3(100) | 10.2(100) | 12.5(100) | 12.0(80) | 11.3(90) | 11.3(80) | 9.2(L)   | 11.3(80) | 10.7(100) |
| 4 | 0.56 | .13 | 11.2(90)  | 12.8(100) | 11.3(60)  | 12.0(90)  | 11.7(50) | 10.0(L)  | 11.7(10) | 11.4(90) | 11.7(10) | 10.0(95) |
| 5 | 1.22 | .28 | 10.7(100) | 8.7(L)    | 9.3(100)  | 11.7(100) | 10.0(90) | 9.0(90)  | 10.8(90) | 8.2(100) | 8.8(90)  | 9.2(95) |
| 6 | 1.44 | .33 | 10.0(90)  | 8.7(L)    | 10.0(100) | 10.8(100) | 8.3(100) | 10.5(100)| 10.7(80) | 10.0(90) | 11.7(30) | 9.2(100) |
| 7 | 1.76 | .40 | 9.0(100)  | 10.5(100) | 5.8(100)  | 10.0(100) | 1.2(100) | 5.0(100) | 10.0(100)| 3.8(100) | 2.0(100) | 8.2(90) |
| 8 | 2.54 | .58 | 4.2(100)  | 9.2(100)  | 6.0(100)  | 5.8(100)  | 2.3(100) | 2.3(100) | 1.7(100) | 2.5(100) | 2.3(100) | 2.5(100) |

V = Vertical cast concrete
H = Horizontal cast concrete
L = Polyethylene delaminated during peel test.

EXAMPLE 3

The experiment as described in Example 2 was repeated except that various other alpha-beta ethylenically unsaturated carboxylic acid polymers as indicated in Table 2 were used in the coating composition.

TABLE 2

Adhesive Strengths of Coated Samples

| Coating | Loading g/ft² | Peel Strengths, ppi after QUV exposure of 0 | 1 wk. | 2 wks. | 4 wks. |
|---|---|---|---|---|---|
| Ethylene acrylic acid[1] | .59 | .8 | 0.5 | 9.0 | 10.5 |
| Ethylene acrylic acid + TiO₂ | 1.07 | 10.0 | 10.0 | 6.3 | 2.5 |
| Ethylene acrylic acid + C | .40 | 8.8 | 9.0 | 7.6 | 8.8 |
| BT-8 | .51 | 7.5 | | | |
| BT-8/TiO₂ | .64 | 11.5 | | | |
| BT-8/C | .54 | 2.5 | | | |

QUV = The Q-Panel Co., Cleveland, Ohio.
[1]Commercially available as 5120 from Allied Corporation
BT-8 = acrylic coating commercially available from ICI.
C = Vulcan carbon black dispersed with the sodium salt of naphthaline sulfonate-formaldehyde condensate before use, commercially available as Daxad 19 from W. R. Grace & Co-Conn.

EXAMPLE 4

The experiment as described in Example 2 was repeated except that various plasticizers were added to the alpha-beta ethylenically unsaturated carboxylic acid polymers.

TABLE 3

Adhesive Strengths of Plasticized Acrylic Coatings

| No. | Formulation (gms) | g/ft² | Peel Strengths, ppi after QUV exposure of 0 wk. | 1 wk. |
|---|---|---|---|---|
| 1 | A(90)/TCP(10) | .41 | 13.8 | 11.0 |
| 2 | A(135)/TCP(15)/C(3) | .71 | 8.8 | 3.8 |
| 3 | A(90)/BSA(10) | .54 | 13.3 | 3.5 |
| 4 | A(135)/BSA(15)/C(3) | .74 | 6.0 | 2.5 |
| 5 | A(90)/23-65(15)/C(3) | .40 | 0 | 12.5 |
| 6 | A(135)/BSA(15)/C(3) | .75 | 0 | 1.4 |

A = Polyacrylic acid solution
TCP = Triaryl phosphate commercially available from FMC Kronitex
BSA = N-n-Butylbenzenesulfonamide commercially available from CP Hall Plasthall
23-65 = linear primary alcohol ethoxylate commercially available from Shell
C = Vulcan carbon black dispersed with the sodium salt of naphthaline sulfonate-formaldehyde condensate before use, commercially available as Daxad 19 from W. R. Grace & Co-Conn.

What is claimed is:

1. A waterproof coating product for application to concrete comprising a bituminous sheet having at least on major surface and a tack-free, water-insoluble polymer selected from polyvinyl alcohol and alpha-beta ethylenically unsaturated carboxylic acid polymer coating, said polymer coating contained on one major surface of the bituminous sheet and forming a free surface of the coating product and being capable of adhering to freshly poured concrete compositions and to the cured concrete substructure formed therefrom.

2. A waterproof coating according to claim 1 wherein the polymer is a water-insoluble polyvinyl alcohol.

3. A waterproof coating according to claim 1 wherein the polymer coating contains a filler material capable of absorbing or reflecting U.V. and I.R. radiation.

4. A waterproof coating according to claim 3 wherein the I.R. and U.V.-absorbing or reflecting filler is selected from the group of silica sand, titanium dioxide, carbon black, aluminum powder, calcium carbonate, talc, kaolin, and mixtures thereof.

5. A waterproof coating according to claim 1 wherein the water-insoluble polymer is polyvinyl alcohol having a degree of polymerization of 2400 to 2500, a number average molecular weight of 105,000 to 110,000 and a weight average molecular weight of 195,500 to 203,500 and over 97% hydrolyzed.

6. A waterproof coating according to claim 5 wherein the polymer coating contains a plasticizer selected from the group of polyethoxylated sorbitol triethanol amine, diethylene triamine, glycerin and mixtures thereof.

7. A waterproof coating according to claim 1 wherein the water-insoluble polymer is an alpha-beta ethylenically unsaturated carboxylic acid polymer.

8. A waterproof coating according to claim 7 wherein the alpah-beta ethylenically unsaturated carboxylic acid polymer is selected from the group of acrylic acid, methyl acrylate, ethyl acrylate, n-propyl acrylate, isopropylacrylate, n-butyl acrylate, isobutyl acrylate, tert-butyl acrylate ethylene acrylic acid, styrene-maleic anhydride, itaconic acid, maleic acid, fumaric acid, mono esters of dicarboxylic acids, and the like, and mixtures thereof.

9. A waterproof coating according to claim 8 wherein the polymer coating contains a plasticizer selected from the group of triaryl phosphate, N-n-butylbenzenesulfonamide, primary alcohol ethoxylate, sulfonate type polymers such as salts of naphthalene sulfonate-formaldehyde condensate, and the like, and mixtures thereof.

10. A method of providing a waterproof bituminous coating to a concrete substructure comprising providing a concrete form having a cavity with an outer member, applying a waterproof coating of claim 1, 2, 3, 4, 5, 6, 7, 8 or 9 to said outer member, said coating positioned to have the bituminous sheet layer facing towards the lagging and the tack-free polymer coating member positioned adjacent to the cavity of said form, pouring a concrete composition into said cavity, and forming a concrete substructure having said bitumin sheet adhered thereto.

* * * * *